US012127681B2

(12) United States Patent
Huang

(10) Patent No.: US 12,127,681 B2
(45) Date of Patent: Oct. 29, 2024

(54) MULTI-LAYER SLEEPING PAD

(71) Applicant: Huaao (Quzhou) Outdoor Products Co., Ltd., Zhejiang (CN)

(72) Inventor: Xiuya Huang, Zhejiang (CN)

(73) Assignee: Huaao (Quzhou) Outdoor Products Co., Ltd., Zhejiang (CN)

(*) Notice: Subject to any disclaimer, the term of this patent is extended or adjusted under 35 U.S.C. 154(b) by 0 days.

(21) Appl. No.: 17/321,249

(22) Filed: May 14, 2021

(65) Prior Publication Data

US 2021/0267381 A1 Sep. 2, 2021

(30) Foreign Application Priority Data

Feb. 23, 2021 (CN) ......................... 202120396359.0

(51) Int. Cl.
*A47C 27/10* (2006.01)
*A47C 27/08* (2006.01)
(Continued)

(52) U.S. Cl.
CPC ............ *A47C 27/10* (2013.01); *A47C 27/081* (2013.01); *A47C 27/08* (2013.01); *A47C 27/082* (2013.01); *A47C 27/084* (2013.01); *A47C 27/087* (2013.01); *A47C 27/18* (2013.01); *A61G 7/05761* (2013.01); *A61G 7/05769* (2013.01); *A61G 7/05776* (2013.01); *A61G 7/05784* (2016.11); *A61G 7/05792* (2016.11)

(58) Field of Classification Search
CPC ....... A47C 27/10; A47C 27/18; A47C 27/088; A47C 27/08; A47C 27/081; A47C 27/082; A47C 27/083; A47C 27/084; A47C 27/087; A61G 7/05761; A61G 7/05769; A61G 7/05776; A61G 7/05784; A61G 7/05792; Y10T 137/3584; Y10T 137/374; Y10T 137/3724; Y10T 137/88046
See application file for complete search history.

(56) References Cited

U.S. PATENT DOCUMENTS 4,924,899 A * 5/1990 Po ............................ A63H 3/06 137/232
6,510,573 B1 * 1/2003 Grabe .................. A47G 9/1027 5/490
(Continued)

FOREIGN PATENT DOCUMENTS

CN 1459266 A 12/2003
CN 201079184 Y 7/2008
(Continued)

OTHER PUBLICATIONS

"Inflate." Merriam-Webster.com Dictionary, Merriam-Webster, https://www.merriam-webster.com/dictionary/inflate. Accessed Apr. 18, 2023. (Year: 2023).*
(Continued)

*Primary Examiner* — David R Hare
*Assistant Examiner* — Deborah Talitha Gedeon

(57) ABSTRACT

A multi-layer sleeping pad, which includes an outer air cushion, an inner air cushion and a first cushion pad. The outer air cushion is provided with a first cavity. The inner air cushion is arranged in the first cavity. The first cushion pad is arranged between an inner top of the outer air cushion and an outer top of the inner air cushion.

8 Claims, 4 Drawing Sheets

(51) Int. Cl.
*A47C 27/18* (2006.01)
*A61G 7/057* (2006.01)

(56) References Cited

U.S. PATENT DOCUMENTS

| | | | | |
|---|---|---|---|---|
| 2013/0340164 | A1* | 12/2013 | Brensinger | A47G 9/062 5/420 |
| 2016/0223095 | A1* | 8/2016 | Sando | F16K 15/205 |

FOREIGN PATENT DOCUMENTS

| | | | | |
|---|---|---|---|---|
| CN | 106820769 | A | | 6/2017 |
| CN | 109043957 | A | * | 12/2018 |
| CN | 209202537 | U | | 8/2019 |
| CN | 2572039 | Y | * | 4/2020 |
| KR | 200410715 | Y1 | * | 12/2005 |
| KR | 100826948 | B1 | * | 5/2007 |
| KR | 20130137890 | A | * | 6/2012 |
| KR | 20010067969 | A | * | 3/2016 |

OTHER PUBLICATIONS https://www.merriam-webster.com/dictionary/cushion#:~:text=cushion%201%20of%202%20noun%20cush%C2%B7%E2%80%8Bion%20%CB%88ku%CC%87-sh%C9%99n%20Synonyms,pad%20usually%20used%20for%20sitting%2C%20reclining%2C%20or%20kneeling (Year: 2023).*

* cited by examiner

MULTI-LAYER SLEEPING PAD

CROSS-REFERENCE TO RELATED APPLICATIONS

This application claims the benefit of priority from Chinese Patent Application No. 202120396359.0, filed on Feb. 23, 2021. The content of the aforementioned application, including any intervening amendments thereto, is incorporated herein by reference in its entirety.

TECHNICAL FIELD

This application relates to sleeping pads, and more particularly to a multi-layer sleeping pad.

BACKGROUND

The sleeping pad is a kind of air pads, which can be used in many aspects. In medical treatment, the air pad allows the patient lying thereon to turn the body more easily, so as to prevent the back wound from being compressed, damp and inflected in a scabbing period, and avoid the occurrence of bedsores. In addition, the air pads can be used outdoors such as beaches. Sometimes, the air pad itself can also work as a bed. However, the conventional air beds are usually filled with air only, such that they are prone to uneven stress under an external force, leading to rapid and large deformation. Moreover, the existing air beds cannot work anymore when an air leakage occurs.

SUMMARY

To solve the problems in the prior art, this disclosure provides a multi-layer sleeping pad.

The technical solutions of the present disclosure are described as follows.

This application provides a multi-layer sleeping pad, which comprises:

an outer air cushion;

an inner air cushion; and a first cushion pad;

wherein the outer air cushion is provided with a first cavity; the inner air cushion is arranged in the first cavity; the first cushion pad is arranged between an inner top of the outer air cushion and an outer top of the inner air cushion; and the first cushion pad is configured to cushion a pressure applied by the inner top of the outer air cushion to the outer top of the inner air cushion.

In some embodiments, the multi-layer sleeping pad further comprises a second cushion pad; the second cushion pad is arranged between an outer bottom of the inner air cushion and an inner bottom of the outer air cushion; and the second cushion pad is configured to cushion a pressure applied by the inner bottom of the outer air cushion to the outer bottom of the inner air cushion.

In some embodiments, the multi-layer sleeping pad further comprises an inflation structure; the inflation structure is connected to the outer air cushion and the inner air cushion; the inner air cushion is provided with a second cavity; and the inflation structure is configured to inflate the first cavity and the second cavity.

In some embodiments, the inflation structure comprises a first inflation assembly and a second inflation assembly; the first inflation assembly is connected to the second inflation assembly and the outer air cushion; the second inflation assembly is connected to the inner air cushion; the first inflation assembly is configured to inflate the first cavity; and the second inflation assembly is configured to inflate the second cavity.

In some embodiments, the first inflation assembly comprises a first sealing assembly and a first air channel; the first sealing assembly is connected to the second inflation assembly and a first end of the first air channel; a second end of the first air channel is arranged in the first cavity; the first air channel is configured to communicate the first cavity with an external environment; and the first sealing assembly is configured to seal the first air channel.

In some embodiments, the first sealing assembly comprises a first sealing part and a first connecting part; one end of the first connecting part is connected to the second inflation assembly and the first end of the first air channel; and the other end of the first connecting part is connected to the first sealing part.

In some embodiments, the second inflation assembly comprises a second sealing assembly and a second air channel; the second sealing assembly is connected to the first inflation assembly and a first end of the second air channel; a second end of the second air channel is arranged in the second cavity; the second air channel is configured to communicate the second cavity with the external environment; and the second sealing assembly is configured to seal the second air channel.

In some embodiments, the second sealing assembly comprises a second sealing part and a second connecting part; one end of the second connecting part is connected to the first inflation assembly and the second air channel; and the other end of the second connecting part is connected to the first sealing part.

In some embodiments, the second inflation assembly further comprises an inflation bag; the inflation bag is connected to the second air channel; and the inflation bag is configured to inflate the second cavity.

In some embodiments, the inflation bag comprises a sponge body, a main body and a one-way valve; the main body is configured to wrap the sponge body; the sponge body is provided with a through hole; the through hole is communicated with the second air channel; and the one-way valve is arranged on a wall of the through hole away from the second air channel.

The beneficial effects of the present disclosure are described as follows.

This disclosure provides a multi-layer sleeping pad, which includes an outer air cushion, an inner air cushion and a first cushion pad. The outer air cushion is provided with a first cavity. The inner air cushion is arranged in the first cavity. The first cushion pad is arranged between an inner top of the outer air cushion and an outer top of the inner air cushion. In use, the outer air cushion is deformed under an external force, and the first cushion pad can cushion a pressure applied by an inner top of the outer air cushion to an outer top of the inner air cushion. In addition, the inner air cushion can play a supporting and buffering role to reduce a deformation of the outer air cushion, allowing for an improved softness.

BRIEF DESCRIPTION OF THE DRAWINGS

The technical solutions of the prior art and the embodiments of this disclosure will be described more clearly with reference to the accompanying drawings. Obviously, presented in the accompanying drawings are some embodiments of the disclosure, and other drawings can be made by those skilled in the art based on the drawings provided herein without sparing creative effort.

Figure 1:
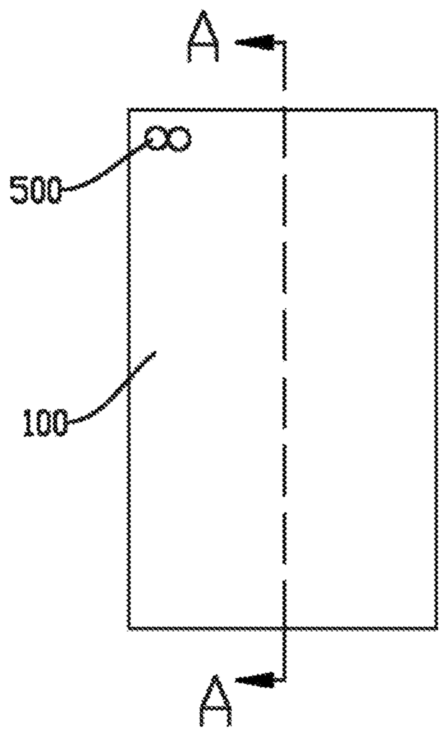
FIG. 1 is a top view of a multi-layer sleeping pad in accordance with an embodiment of the present disclosure.

In the drawings: 10. multi-layer sleeping pad; 100, outer air cushion; 110, first cavity; 200, inner air cushion; 210, second cavity; 300, first cushion pad; 400, second cushion pad; 500, inflation structure; 510, first inflation assembly; 511, first sealing assembly; 5111, first sealing part; 5112, first connecting part; 5113, first convex surface; 5114, first concave surface; 512, first air channel; 520, second inflation assembly; 521, second sealing assembly; 5211, second sealing part; 5212, second connecting part; 5213, second convex surface; 5214, second concave surface; 522, second air channel; 523, inflation bag; 5231; sponge body; 5232, through hole; 5233, one-way valve; and 5234, main body.

DETAILED DESCRIPTION OF EMBODIMENTS

The present disclosure will be further described below clearly with reference to the accompanying drawings and the embodiments.

Figure 2:
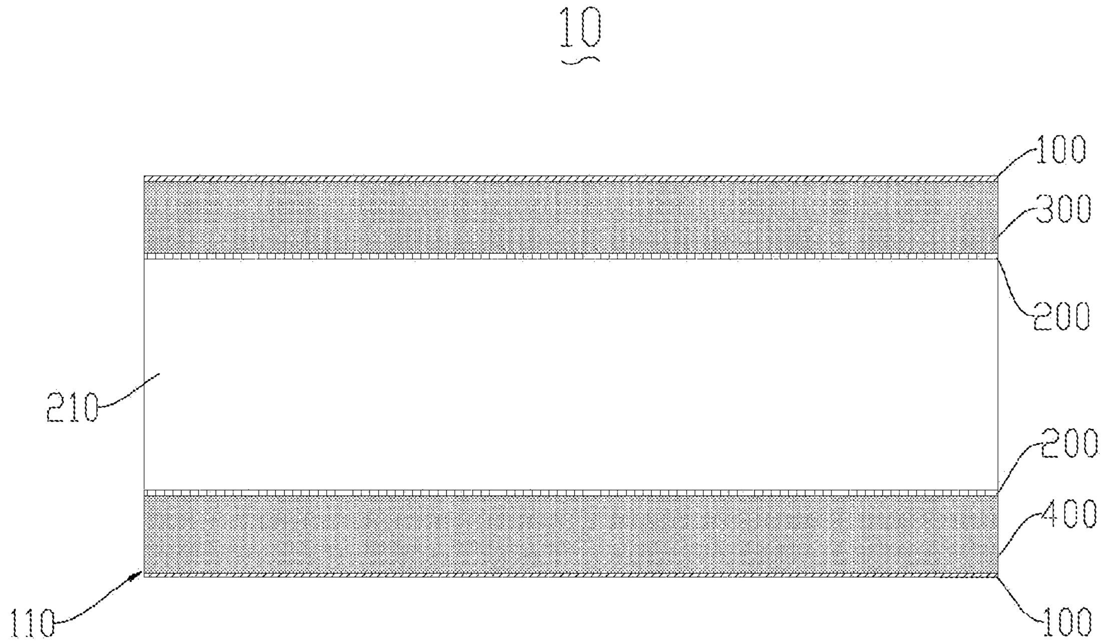
FIG. 2 is a cross-sectional view of the multi-layer sleeping pad in FIG. 1 along the line A-A.
Figure 3:
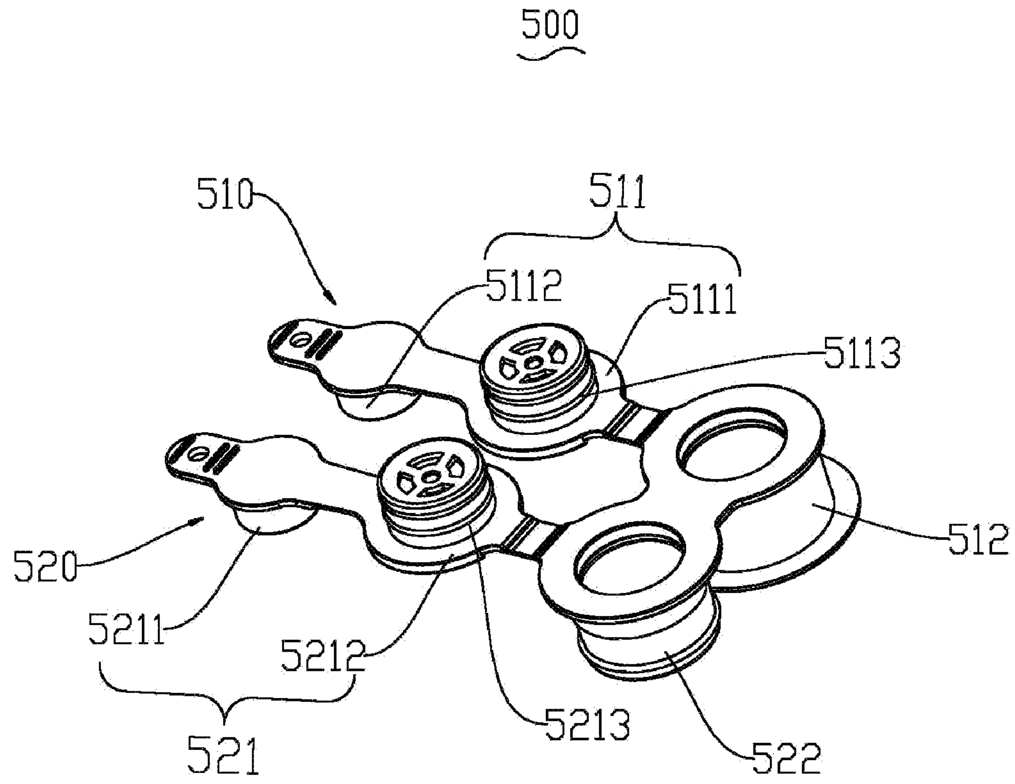
FIG. 3 schematically depicts a structure of an inflation structure in accordance with an embodiment of the present disclosure.
Figure 4:
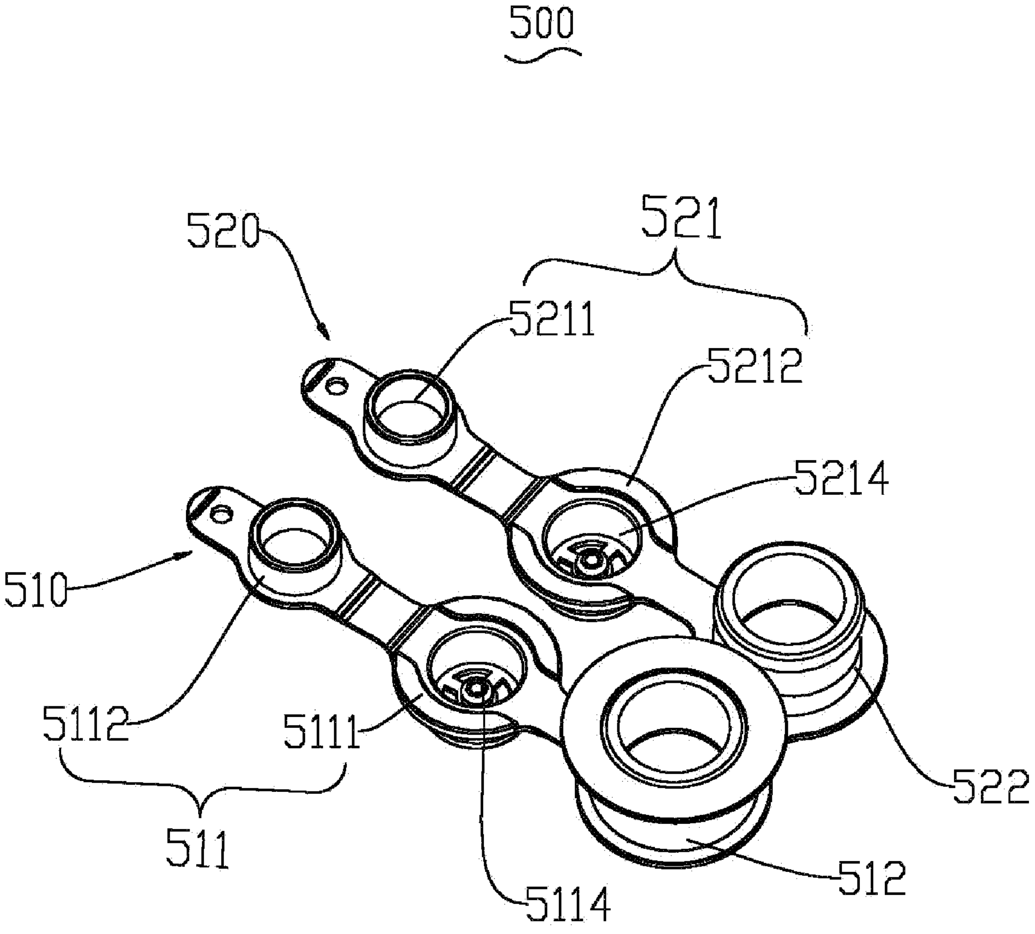
FIG. 4 schematically depicts the structure of the inflation structure in accordance with an embodiment of the present disclosure from another view.
Figure 5:
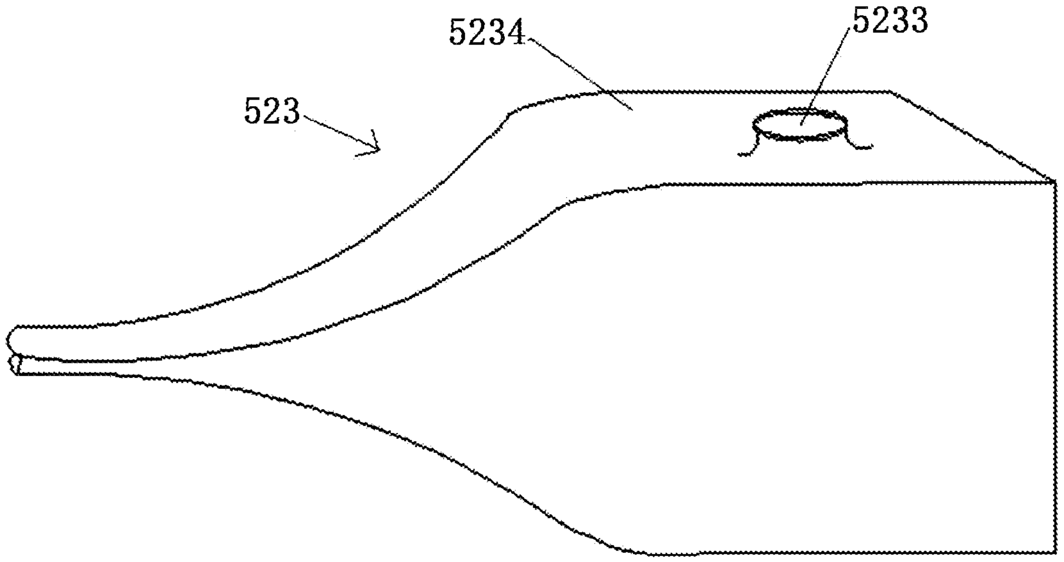
FIG. 5 schematically depicts a structure of an inflation bag in accordance with an embodiment of the present disclosure.
Figure 6:
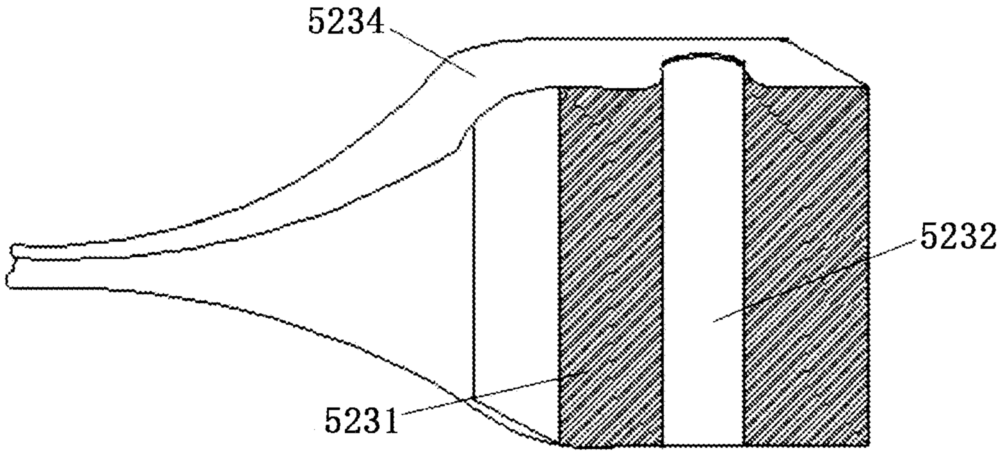
FIG. 6 is a cross-sectional view of the inflation bag in accordance with an embodiment of the present disclosure.

As shown in FIGS. 1-4, a multi-layer sleeping pad 10 is provided, which includes an outer air cushion 100, an inner air cushion 200 and a first cushion pad 300. The outer air cushion 100 is provided with a first cavity 110. The inner air cushion 200 is arranged in the first cavity 110. The first cushion pad 300 is arranged between an inner top of the outer air cushion 100 and an outer top of the inner air cushion 200. The first cushion pad 300 is configured to cushion a pressure applied by the inner top of the outer air cushion 100 to the outer top of the inner air cushion 200. When in use, the outer air cushion 100 is deformed under an external force, and the first cushion pad 300 can cushion the pressure applied by the inner top of the outer air cushion 100 to the outer top of the inner air cushion 200. In addition, the inner air cushion 200 can play a supporting and buffering role to reduce a deformation of the outer air cushion 100 and increase a softness of the multi-layer sleeping pad 10.

In some embodiments, the first cushion pad 300 is made of sponge.

In some embodiments, the multi-layer sleeping pad 10 further includes a second cushion pad 400. The second cushion pad 400 is arranged between an outer bottom of the inner air cushion 200 and an inner bottom of the outer air cushion 100. The second cushion pad 400 is configured to cushion a pressure applied by the inner bottom of the outer air cushion 100 to the outer bottom of the inner air cushion 200. In an embodiment, when the multi-layer sleeping pad 10 is used on the beach or in the wild, a bottom of the outer air cushion 100 is likely to be pierced by an external object, resulting in an air leakage of the outer air cushion 100. The second cushion pad 400 can prevent the inner air cushion 200 from being pierced by the external object. In some embodiments, the second cushion pad 400 is made of sponge.

In some embodiments, the multi-layer sleeping pad 10 further includes an inflation structure 500. The inflation structure 500 is connected to the outer air cushion 100 and the inner air cushion 200. The inner air cushion 200 is provided with a second cavity 210. The inflation structure 500 is configured to inflate the first cavity 110 and the second cavity 210.

In some embodiments, the inflation structure 500 includes a first inflation assembly 510 and a second inflation assembly 520. The first inflation assembly 510 is connected to the second inflation assembly 520 and the outer air cushion 100. The second inflation assembly 520 is connected to the inner air cushion 200. The first inflation assembly 510 is configured to inflate the first cavity 110, and the second inflation assembly 520 is configured to inflate the second cavity 210.

In some embodiments, the first inflation assembly 510 includes a first sealing assembly 511 and a first air channel 512. The first sealing assembly 511 is connected to the second inflation assembly 520 and a first end of the first air channel 512. A second end of the first air channel 512 is arranged in the first cavity 110. The first air channel 512 is configured to communicate the first cavity 110 with an external environment, and the first sealing assembly 511 is configured to seal the first air channel 512.

In some embodiments, the first sealing assembly 511 includes a first sealing part 5111 and a first connecting part 5112. One end of the first connecting part 5112 is connected to the second inflation assembly 520 and the first end of the first air channel 512. The other end of the first connecting part 5112 is connected to the first sealing part 5111. In some embodiments, the first connecting part 5112 is provided with a first convex surface 5113 and a first concave surface 5114. When in use, the first convex surface 5113 of the first connecting part 5112 is connected to the first air channel 512, and the first sealing part 5111 is connected to the first concave surface 5114 of the first connecting part 5112 to seal the first air channel 512. In some embodiments, the first sealing assembly 511 further includes a first gasket. The first gasket is arranged on the first convex surface 5113. The first gasket increases a sealing performance of the first convex surface 5113 to the first air channel 512. In some embodiments, the first gasket is made of, but not limited to, rubber.

The second inflation assembly 520 includes a second sealing assembly 521 and a second air channel 522. The second sealing assembly 521 is connected to the first inflation assembly 510 and a first end of the second air channel 522. A second end of the second air channel 522 is arranged in the second cavity 210. The second air channel 522 is configured to communicate the second cavity 210 with the external environment, and the second sealing assembly 521 is configured to seal the second air channel 522.

The second sealing assembly 521 includes a second sealing part 5211 and a second connecting part 5212. One end of the second connecting part 5212 is connected to the first inflation assembly 510 and the second air channel 522, and the other end of the second connecting part 5212 is connected to the first sealing part 5111. In some embodiments, the second connecting part 5212 is provided with a second convex surface 5213 and a second concave surface 5214. When in use, the second convex surface 5213 of the second connecting part 5212 is connected to the second air channel 522, and second sealing part 5211 is connected to the second concave surface 5214 of the second connecting part 5212 to seal the second air channel 522. In some embodiments, the second sealing assembly 521 further includes a second gasket, and the second gasket is arranged on the second convex surface 5213. The second gasket increases a sealing performance of the second convex surface 5213 to the second air channel 522. In some embodiments, the second gasket is made of, but not limited to, rubber.

The second inflation assembly 520 further includes an inflation bag 523. The inflation bag 523 is connected to the second air channel 522, and the inflation bag 523 is configured to inflate the second cavity 210. The inflation bag 523 includes a sponge body 5231, a main body 5234 and a one-way valve 5233. The main body 5234 is configured to wrap the sponge body 5231. The sponge body 5231 is provided with a through hole 5232. The through hole 5232 is communicated with the second air channel 522. The one-way valve 5233 is arranged on a wall of the through hole 5232 away from the second air channel 522.

During the inflation, the one-way valve 5233 is switched off, and the sponge body 5231 is pressed, such that air in the through hole 5232 enters the second cavity 210 through the second air channel 522 to inflate the second cavity 210.

The principles, technical solutions and beneficial effects of the present disclosure are described above. For those skilled in the art, it should be understood that the embodiments are illustrative, and not intended to limit the present disclosure. Various changes and improvements made by those skilled in the art without departing from the spirit of the present disclosure should fall within the scope of this present disclosure defined by the appended claims.

What is claimed is:

1. A multi-layer sleeping pad, comprising:

an outer air cushion;

an inner air cushion; and a first cushion pad;

wherein the outer air cushion is provided with a first cavity; the inner air cushion is arranged in the first cavity, such that the first cavity is divided into a first sub-cavity arranged between an inner top of the outer air cushion and an outer top of the inner cushion and a second sub-cavity arranged between an outer bottom of the inner air cushion and an inner bottom of the outer air cushion; the first cushion pad is arranged in the first sub-cavity; and the first cushion pad is configured to cushion a pressure applied by the inner top of the outer air cushion to the outer top of the inner air cushion;

the multi-layer sleeping pad further comprises an inflation structure; the inflation structure is connected to the outer air cushion and the inner air cushion; the inner air cushion is provided with a second cavity; and the inflation structure is configured to inflate the first sub-cavity, the second sub-cavity and the second cavity;

the inflation structure comprises a first inflation assembly and a second inflation assembly; the first inflation assembly is connected to the second inflation assembly and the outer air cushion; the second inflation assembly is connected to the inner air cushion; the first inflation assembly is configured to inflate the first sub-cavity and the second sub-cavity; and the second inflation assembly is configured to inflate the second cavity;

the first inflation assembly comprises a first sealing assembly and a first air channel; the first sealing assembly is connected to the second inflation assembly and a first end of the first air channel; a second end of the first air channel is arranged in the first cavity; the first air channel is configured to communicate the first cavity with an external environment; and the first sealing assembly is configured to seal the first air channel;

the first sealing assembly comprises a first sealing part and a first connecting part; one end of the first connecting part is connected to the second inflation assembly and the first end of the first air channel; and the other end of the first connecting part is connected to the first sealing part; and the first connecting part is provided with a first convex surface and a first concave surface; the first convex surface is configured to be connected to the first air channel in use, and the first concave surface is configured to be connected to the first sealing part in use; the first sealing assembly further comprises a first gasket; and the first gasket is arranged on the first convex surface, and is configured to enhance sealing between the first convex surface and the first air channel.

2. The multi-layer sleeping pad of claim 1, wherein the multi-layer sleeping pad further comprises a second cushion pad; the second cushion pad is arranged in the second sub-cavity; and the second cushion pad is configured to cushion a pressure applied by the inner bottom of the outer air cushion to the outer bottom of the inner air cushion.

3. The multi-layer sleeping pad of claim 2, wherein the first cushion pad and the second cushion pad are both made of sponge.

4. The multi-layer sleeping pad of claim 1, wherein the second inflation assembly comprises a second sealing assembly and a second air channel; the second sealing assembly is connected to the first inflation assembly and a first end of the second air channel; a second end of the second air channel is arranged in the second cavity; the second air channel is configured to communicate the second cavity with an external environment; and the second sealing assembly is configured to seal the second air channel.

5. The multi-layer sleeping pad of claim 4, wherein the second sealing assembly comprises a second sealing part and a second connecting part; one end of the second connecting part is connected to the first inflation assembly and the second air channel; and the other end of the second connecting part is connected to the first sealing part.

6. The multi-layer sleeping pad of claim 5, wherein the second connecting part is provided with a second convex surface and a second concave surface; the second convex surface is configured to be connected to the second air channel in use, and the second concave surface is configured to be connected to the second sealing part in use; the second sealing assembly further comprises a second gasket; and the second gasket is arranged on the second convex surface, and is configured to enhance sealing between the second convex surface and the second air channel.

7. The multi-layer sleeping pad of claim 4, wherein the second inflation assembly further comprises an inflation bag; the inflation bag is connected to the second air channel; and the inflation bag is configured to inflate the second cavity.

8. The multi-layer sleeping pad of claim 7, wherein the inflation bag comprises a sponge body, a main body and a one-way valve; the main body is configured to wrap the sponge body; the sponge body is provided with a through hole; the through hole is communicated with the second air channel; and the one-way valve is arranged on a wall of the through hole away from the second air channel.

* * * * *